United States Patent
Ohya et al.

[15] 3,651,714
[45] Mar. 28, 1972

[54] HYDRAULIC CONTROL SYSTEM FOR AN AUTOMATIC TRANSMISSION

[72] Inventors: Minoru Ohya; Keiji Kogaki, both of Toyota, Japan

[73] Assignee: Toyota Jidosha Kogyo Kabushiki Kaisha, Aichi-ken, Japan

[22] Filed: May 18, 1970

[21] Appl. No.: 38,169

[30] Foreign Application Priority Data

May 21, 1969 Japan..................................44/38792

[52] U.S. Cl. ..............................74/867, 74/869, 74/DIG. 1
[51] Int. Cl. ....................................B60k 21/00, B60k 29/00
[58] Field of Search ..........................................74/867, 868, 869

[56] References Cited

UNITED STATES PATENTS

| | | | |
|---|---|---|---|
| 3,080,768 | 3/1963 | Jania | 74/869 |
| 3,295,387 | 1/1967 | Leonard et al. | 74/869 X |
| 3,274,848 | 9/1966 | Konrad et al. | 74/869 X |
| 3,308,676 | 3/1967 | Zundel et al. | 74/869 X |
| 3,309,939 | 3/1967 | Pierce, Jr. | 74/869 X |
| 3,310,991 | 3/1967 | Leonard | 74/869 X |
| 3,400,612 | 9/1968 | Pierce, Jr. | 74/869 X |
| 3,446,098 | 5/1969 | Searles | 74/869 |

Primary Examiner—Carlton R. Croyle
Assistant Examiner—Thomas C. Perry
Attorney—McGlew and Toren

[57] ABSTRACT

A hydraulic control system is provided for an automatic automotive vehicle transmission of the type including a gear changing unit, such as a planetary gear unit, having brakes and clutches controlled by hydraulically operated servo units, and including hydraulic torque transmitting means, such as a torque converter, coupling the gear changing unit to the vehicle engine. The hydraulic control system includes a cutoff valve hydraulically associated with a pressure regulator valve and other related control valves. The cutoff valve operates as a line pressure regulator when the pressure regulator valve is rendered ineffective in set positions of a manual speed selector valve. In particular, the cutoff valve becomes effective, with the pressure regulator valve becoming ineffective, when the speed selector valve is moved into the "reverse" position. The cutoff valve provides a higher control pressure for the servo units, during gear shifting in the reverse range, than the control pressure available for the servo units during gear shifting in the ordinary forward driving range.

9 Claims, 5 Drawing Figures

HYDRAULIC CONTROL SYSTEM FOR AN AUTOMATIC TRANSMISSION

BACKGROUND OF THE INVENTION

In automatic transmissions of the type including planetary gear units as gear changing units, the speed changes are provided by selective application of brake bands and selective engagement of clutches. It is necessary that the line pressure available for operating the servo units has a value sufficiently high that, when the servo units are operated, the brake bands are fully applied and the clutches are fully engaged. As a means of enhancing the effectiveness of the operation of the brake bands and the clutches during driving in forward speeds, a recent trend has been to adopt double lap brake units. While this enhances the effectiveness of brake and clutch operation while driving in forward speeds, the force of application of the brake bands and the force of engagement of the clutches when driving in reverse is decreased in an order of magnitude equal to the increase when driving in the forward direction.

Thus, if the line pressure available for brake and clutch operation during reverse speed is maintained equal to that available during driving in forward speeds, to operate the servo controls, the brake and clutch units, during driving in reverse speed, will slip and will not be effectively actuated. Accordingly, it is desirable that the line pressure available for operation of the servo control units, when driving in reverse, be maintained at a much higher value than the line pressure available for operating the servo control units during driving in forward speeds, in order to assure effective operation of the clutches and brakes when driving in reverse speed.

SUMMARY OF THE INVENTION

This invention relates to hydraulic control systems for automatic transmissions for use with automotive vehicles, and is generally applicable to automatic transmissions of the type having a three-member torque converter comprising a pump, a turbine runner and a stator, and further comprising a gear changing unit operable by brake bands and clutches.

The primary object of the invention is to provide a hydraulic control means, for automatic transmissions, assuring positive and safe reverse gear selection by providing a higher control or line pressure for reverse gear selection than is provided for forward gear selection in the usual driving range, this higher pressure being applied as a servo hydraulic pressure to the clutches and the brake bands.

In accordance with the invention, the hydraulic control system is applied to an automatic transmission including a torque converter or a fluid coupling, and further including a gear change device or unit having hydraulically operated servo units, such as brakes, clutches, etc. A hydraulic pressure produced by a hydraulic fluid pump is applied to a pressure regulator valve which regulates a hydraulic line pressure for operation of the servo units. A valve unit is installed in a passage for hydraulic fluid under pressure, and in which the hydraulic line pressure is controlled and exhausted. In accordance with the position of the valve unit, this passage is either blocked off or placed in communication with other passages. The position of the valve unit is determined in accordance with the speed selecting position of a manual speed selector valve. The line pressure, normally controlled by the pressure regulator valve, is thus caused to change in dependence upon the position of the valve unit, which, in turn, depends upon the speed selecting position of the speed selector valve. More particularly, the line pressure is substantially increased when the speed selector valve is moved to the "reverse" position, and preferably also when the speed selector valve is in the "neutral" and "park" positions.

An object of the invention is to provide an improved hydraulic control system for an automatic transmission for automotive vehicles.

Another object of the invention is to provide such a hydraulic control system in which a line pressure effective to assure positive and safe operation of brakes and clutches is provided when a manual speed selector valve is moved into the "reverse" position.

A further object of the invention is to provide such a hydraulic control system in which the line pressure available to operate the brakes and clutches is very substantially increased when a manual speed selector valve is moved to the "reverse" position.

Another object of the invention is to provide such a hydraulic control system including a cut-off valve operatively associated with the pressure regulator valve, with the pressure regulator valve being rendered ineffective when the speed selector valve is moved to the "reverse" position and with the cut-off valve then acting as a pressure regulator to regulate the line pressure to a substantially increased value.

For an understanding of the principles of the invention, reference is made to the following description of typical embodiments thereof as illustrated in the accompanying drawings.

DESCRIPTION OF THE PREFERRED EMBODIMENTS

Figure 1:
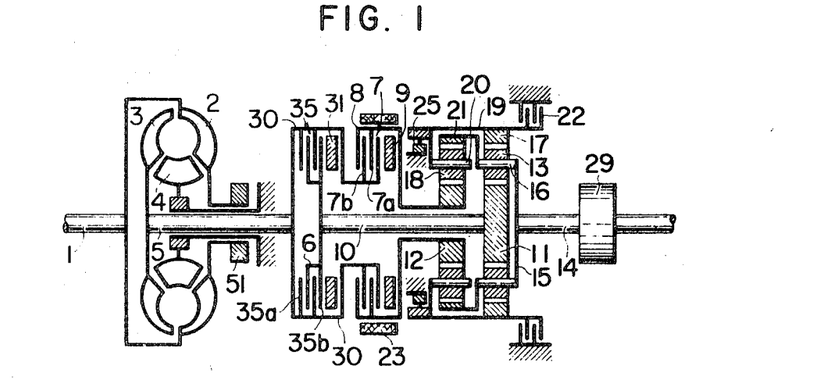
FIG. 1 is a somewhat schematic illustration of an automatic transmission for automotive vehicles, to which a hydraulic control system embodying the present invention is applicable.

The automatic transmission schematically illustrated in FIG. 1 has three forward speeds and one reverse speed, and includes a torque converter comprising a pump impeller 2, directly coupled to an engine crank shaft 1, a turbine runner 3 and a turbine stator 4. The engine power is transmitted to turbine runner 3 from pump impeller 2 through a hydraulic fluid, such as oil, and the oil flowing from impeller 2 to turbine runner 3 is directed by stator vanes 4 to return to pump impeller 2. Due to such oil circulation, an output torque is continuously available at a turbine shaft 5 which is secured to turbine runner 3. The output torque of shaft 5 is transmitted to a gear change unit located behind the torque converter and, in a known manner, selection of the three forward speeds and the single reverse speed is effected by automatic control of clutches and brakes, of a planetary gear system, by servo units having supplied thereto a preselected hydraulic line pressure.

With reference to the gear change unit positioned behind the torque converter, the turbine blade 3, coupled with turbine shaft 5, drive shaft 5 so that the latter forms an input shaft for the planetary gear system. Turbine shaft 5 rotates as a single body with a drum 30, being connected thereto, for example, by a spline connection. Within drum 30, there is a multiple disc clutch 35, hereinafter referred to as a "front clutch", which is engaged or disengaged by a hydraulically operated piston 31.

Front clutch 35 includes clutch plates 35a whose outer peripheries are splined to drum 30 so as to be movable only axially, and further includes clutch plates 35b which are capable of frictionally engaging clutch plates 35a and which have their inner peripheries splined to a hub 6 so as to be movable only axially. Hub 6 is integral with an intermediate shaft 10 to form a single body therewith.

Clutch discs 7b of a multiple disc clutch 7, hereinafter called a "rear clutch," have a spline connection on the rear of front clutch drum 30, and the clutch plates 7a of clutch 7 have their outer peripheries splined to a rear clutch drum 8, so as to be movable axially. Similarly to front clutch 35, rear clutch 7 is engaged or released by a hydraulically operated piston 9. Intermediate shaft 10, which is integral with hub 6 of front clutch 35, has its rear end fixed to rotate with a rear sun gear 11 of the planetary gear system, and rear clutch drum 8 is fixed to rotate with a front sun gear 12.

Rear sun gear 11 meshes with a plurality of rear planetary pinions 13 positioned around its periphery, and pinions 13 mesh with a rear ring gear 17. Rear planetary pinions 13 are rotatably supported on rear pinion pins 16, and one end of each pin 16 is supported by a rear planetary pinion carrier 15 integral with an output shaft 14 of the gear change unit. The other end of each pin 16 is supported on the rear surface of a front ring gear 21.

Front sun gear 12 meshes with a plurality of front planetary pinions 18 positioned around its outer periphery, and pinions 18 mesh with front ring gear 21. Front pinions 18 are rotatably supported on front pinion pins 20 which are carried by a front planetary pinion carrier 19 to form a unitary body with rear ring gear 17. A brake unit 22, including a clutch and hereinafter called a "rear brake" is provided between front carrier 19 and the casing of the gear change unit. Carrier 19 and rear ring gear 17 are held stationary or are released by applying rear brake 22 or releasing rear brake 22, respectively.

A brake 23, hereinafter called a "front brake" is cooperable with the outer periphery of rear clutch drum 8, and drum 8 and front sun gear 12 are either held stationary or released by applying and releasing, respectively, front brake 23. Carrier 19 is provided with a one-way brake 25 which performs the same function as rear brake 22 in the first speed, or low gear, as described hereinafter.

The gear changing action of the transmission will now be described:

To select the first speed, or low gear, front clutch 35 and rear brake 22 are engaged. However, when the transmission is driven from the engine side, one-way brake 25 may be actuated, for selecting the first speed, even though rear brake 22 is not engaged, so that it is not necessary to apply rear brake 22 if one-way brake 25 is provided. The torque of turbine shaft 5 is transmitted to rear sun gear 11 through front clutch 35. Since rear ring gear 17 is held stationary by rear brake 22, torque will be transmitted to rear carrier 15, or output shaft 14, from rear sun gear 11 as its angular velocity is being reduced.

To select the second speed, or second gear, front clutch 35 is maintained engaged, rear brake 22 is released, and front brake 23 is engaged. Under these conditions, the torque of turbine shaft 5 will be transmitted to rear sun gear 11 through front clutch 35. Since clutch drum 8 and front sun gear 12 are held stationary by front brake 23, the torque of rear sun gear 11 will be transmitted to output shaft 14 with the speed reduced to the second speed.

The third speed, or high gear, is obtained by engaging both front clutch 35 and rear clutch 7. As a result, front sun gear 12 and rear sun gear 11 rotate as a single unit, and the whole planetary gear system rotates as a unit. Accordingly, output shaft 14 will be driven as if directly coupled to turbine shaft 5.

To move backward, or move in reverse gear, both rear clutch 7 and rear brake 22 are engaged. Front carrier 19 is held stationary by rear brake 22, and the torque of turbine shaft 5 is delivered to front sun gear 12 through rear clutch 7, and to output shaft 14 through pinions 18, ring gear 21 and pinions 13, so that output shaft 14 is rotated in an angular direction opposite to the direction of rotation of turbine shaft 5 and at a reduced speed. Thus, by the combination of a planetary gear system, two clutch units and two brake units, three forward speeds and one reverse speed can be established.

The operations of the clutches and brakes in the transmission are summarized in the following Table No. 1.

TABLE NO. 1

| Operation Speed | Apply | Release |
| --- | --- | --- |
| First forward | Front Clutch (35), rear brake (22) or one way brake clutch (25). | Rear clutch (7), front brake (23). |
| Second forward | Front clutch (35), front brake (23). | Rear clutch (7) rear brake (22). |
| Third forward | Front clutch (35), rear clutch (7). | Front brake (23), rear brake (22). |
| Reverse | Rear clutch (7), rear brake (22). | Front clutch (35), front brake (23). |

Figure 2:
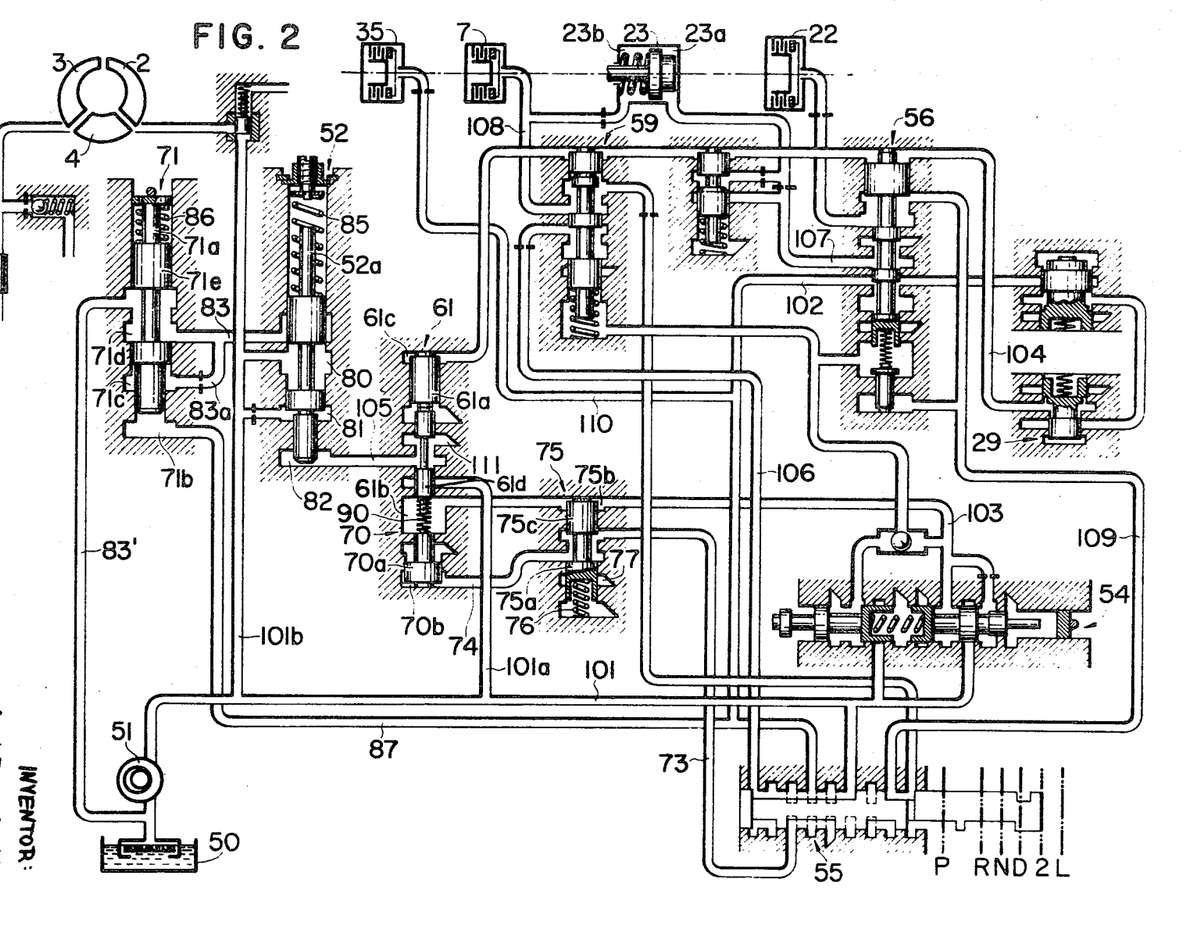
FIG. 2 is a schematic representation of one form of hydraulic control system embodying the invention.

Turning now to FIG. 2, which illustrates the hydraulic circuit for controlling the servo oil pressure for clutches 35 and 7 and brakes 22 and 23, oil is pumped up from an oil sump 50 by an oil pump 51 driven by the engine through pump impeller 2, and oil under pressure is supplied to a line pressure passage 101. The hydraulic line pressure PL of passage 101 is regulated by a pressure regulator valve 52, and the line pressure is supplied to a throttle valve 54 and a manually operable speed selector valve 55. By means of throttle valve 54, opening of an engine throttle is perceived as a displacement of the plunger of throttle valve 54, and thus this displacement, or a hydraulic pressure proportional to the throttle opening, is produced in a passage 103. The hydraulic pressure in passage 103 is hereinafter called a throttle pressure Pth. The vehicle speed is detected by a governor 29 driven by output shaft 14, and converted into a governor pressure Pgo which is applied to a passage 104.

The gear ratios of the planetary gear system are changed by operation of "1–2" and "2–3" shift valves 56 and 59, respectively, which are actuated by the throttle pressure Pth and the governor pressure Pgo acting in opposition to each other. The line pressure $P_L$ is supplied to passages 110, 102 and 106, which connect front clutch 35 and shift valves 56 and 59 to manual speed selector valve 55 in the position "D" of manual speed selector valve 55. When the governor pressure Pgo in passage 104 is low, the planetary gear system establishes the first speed through one-way clutch 25 and front clutch 35 to which is applied the line pressure $P_L$.

When the vehicle speed attains a certain value corresponding to an opening of the engine throttle valve, the 1–2 shift valve 56 is moved downwardly by governor pressure Pgo to connect passage 102 with a passage 107, and thereby the line pressure $P_L$ is applied to the "engage" side 23a of front brake 23 and to front clutch 35 to establish the second speed. When the vehicle speed attains a higher value corresponding to a predetermined throttle opening, the 2–3 shift valve 59 is moved downwardly by governor pressure Pgo to connect passage 106 with the passage 108, so that line pressure $P_L$ is applied to front clutch 35, rear clutch 7, and the "release" side 23b of front brake 23. Thereby, the planetary gear system rotates as a unit to connect turbine shaft 5 directly with output shaft 14, thus establishing the third speed.

Shifting from the third speed to the first or low speed may be effected by exhausting the hydraulic pressures in passages 107 and 108 by means of 1–2 shift valve 56 and 2–3 shift valve 59, respectively. Since the line pressure $P_L$ is not applied to hydraulic passage 106 when manual valve 55 is set for position "2", a change-over operation by 2–3 shift valve 59 will not be effected.

By setting manual valve 55 in position "R", the line pressure $P_L$ in passage 101 is supplied to passages 106, 108, and 109 to engage rear clutch 7 and rear brake 22, thus establishing the reverse speed. The hydraulic control of the line pressure $P_L$ applied to the brake units and clutch units is effected by pressure regulator valve 52.

Figure 5:
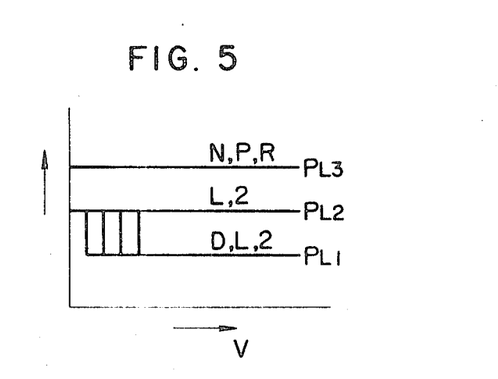
FIG. 5 graphically illustrates characteristic curves showing the relation between control hydraulic pressure and the vehicle speed, for a hydraulic control system embodying the present invention.

The hydraulic characteristics of the control circuit shown in FIG. 2 and embodied in the invention, are represented graphically in FIG. 5. Referring to this Figure, it will be noted that two pressure levels, $P_{L1}$ and $P_{L2}$, of low and high constant pressure values, respectively, are obtained in accordance with the degree of opening of the engine throttle valve in positions "L", "2", and "D" of manual speed selector valve 55. Additionally, in positions "N", "P", and "R" of manual speed selector valve 55, a still higher constant pressure value $P_{L3}$ is obtained regardless of the opening of the engine throttle valve.

The pressure levels illustrated in FIG. 5 are obtained by pressure regulator valve 52 in cooperation with various valves for changing the control function of pressure regulator valve 52, such as a change-over valve 61, a blocking valve 70, a relay valve 75 and a cut-off valve 71. Line pressure passage 101 is branched into passages 101a and 101b, and the line pressure $P_L$ is supplied to pressure regulator valve 52 through branch passage 101a and a passage 105. Change-over valve 61 is interposed between passages 101a and 105, and has a coil spring 90 in an oil chamber 61b at its lower end. Valve element 61a of valve 61 is biased upwardly by spring 90 and, at the same time, oil chamber 61b receives the throttle pressure Pth in passage 103, and which throttle pressure corresponds to the opening of the engine throttle valve. This results in moving valve element 61a upwardly.

On the other hand, an oil chamber 61c at the upper end of valve 61 has supplied thereto the governor pressure Pgo in passage 104, corresponding to the vehicle speed, and biasing valve element 61a to move downwardly. Thus, element 61a is controlled by the downwardly acting governor pressure Pgo and the upwardly acting throttle pressure Pgo, the latter combined with the bias of spring 90, to move upwardly and downwardly. Of these forces, the upward spring bias has a constant value which is predetermined, so that changeover valve 61 will be actuated according to the difference between throttle pressure Pth and governor pressure Pth.

At low vehicle speeds, if the effect due to throttle pressure Pth is greater than that due to governor pressure Pgo, valve element 61a occupies an upper position as shown in FIG. 2, and passage 105 is blocked off from passage 101a by a valve land 61d, and communicates with an exhaust port 111 thus exhausting the oil pressure in passage 105 to port 111. If, with an increase of vehicle speed, the effect due to governor pressure Pgo becomes greater than that due to throttle pressure Pth, valve element 61a of valve 61 is moved downwardly to establish communication between passage 105 and passage 101a, thus permitting the line pressure $P_L$ in passage 101a to act on pressure regulator valve 52 through passage 105.

Blocking valve 70 is provided beneath change-over valve 61 and coaxially therewith. An oil chamber 70b of blocking valve 70 is connected to manual valve 55 through passages 74 and 73, and relay valve 75 is interposed between these two passages. Relay valve 75 has an oil chamber 75b, interposed in throttle pressure passage 103, at one end, and has a spring 76 at its other end. Throttle pressure Pth and the bias of spring 76 act in opposition to each other on valve element 75a of relay valve 75. However, as spring 76 has a predetermined constant value, valve element 75a is actuated depending upon whether the effective force of throttle pressure Pth overbalances the force of spring 76, or whether the force of spring 76 is greater than the throttle pressure. When the force exerted by throttle pressure Pth is smaller than the force exerted by spring 76, valve element 75a occupies the upper position shown in FIG. 2, to connect passage 73 with passage 74. If the throttle pressure Pth increases to an extent sufficient to overcome the force of spring 76, valve element 75a is moved downwardly against the spring bias to block passage 73 from passage 74 by a land 75c, and further to connect passage 74 with an exhaust port 77 to exhaust the oil pressure of passage 74.

Line pressure $P_L$ is supplied to passage 73 only when manual valve 55 is in the positions "L" and "2", and is supplied to passage 74 only when valve element 75a of relay valve 75 occupies the upper position, when throttle pressure Pth is lower than the predetermined value. Under conditions other than this condition, the hydraulic pressure in passage 74 is exhausted from exhaust port 77 and manual valve 55.

When, in the absence of hydraulic pressure in passage 74, valve element 70a of blocking valve 70 occupies a lower position under the downward force of spring 90 in chamber 70b, no upward force is supplied to valve element 61a of changeover valve 61, so that change-over valve 61 is free to function as described above. When line pressure $P_L$ is supplied to passage 74, it will act on valve element 70a of blocking valve 70 through chamber 70b to move valve element 70a upwardly and thus forcibly move upwardly valve element 61a of changeover valve 61, through valve element 70a. Thus, change-over valve 61 cannot move responsive to throttle pressure Pth or governor pressure Pgo, and passage 105 remains connected with exhaust port 111 or, stated in another way, the hydraulic pressure applied beneath pressure regulator valve 52 is the exhaust or return pressure.

Pressure regulator valve 52, which regulates the line pressure $P_L$ applied to clutches 35 and 7 and brakes 22 and 23, includes a coil spring 85 at the upper end of a valve element 52a and biasing this valve element downwardly. Associated with the lower portion of pressure regulator valve 52 are three chambers 80, 81 and 82, and oil under pressure from pump 51 acts in chambers 80 and 81 which are in communication with passage 101b. The hydraulic pressure in passage 105 is applied through chamber 82 to change-over valve 61.

The hydraulic pressure in chambers 81 and 82 acts to move valve element 52a upwardly against the bias of spring 85. Thus, valve element 52a will adjust the pressure in chamber 80 in accordance with the upwardly and downwardly acting forces, so as to provide a regulated line pressure $P_L$ in passage 101, through blocking or establishing connection between chamber 80 and passage 83.

Communication between passage 83 and exhaust or return passage 83' leading to oil sump 50 is blocked or established by cut-off valve 71 in accordance with respective positions of manual speed selector valve 55. Cut-off valve 71 includes a coil spring 86 engaging the upper end of a valve element 71a to apply a downward bias to the valve element. The valve further includes, in ascending order, oil chambers 71b, 71c and 71d. Chamber 71b is connected to passage 110, communicating with manual valve 55, through a passage 87. Thus, line pressure $P_L$ is supplied to chamber 71b, from manual valve 55, in positions "D", "2" and "L", of valve 55, so that an upwardly acting force is imparted to valve element 71a. In positions "N", "P" and "R" of manual valve 55, the hydraulic pressure in chamber 71b is relieved, so that no upwardly acting force is applied to valve element 71a. Chamber 71c is connected to exhaust passage 83 through a passage 83a, and thus the hydraulic pressure in exhaust passage 83 will act on valve element 71a to move the latter upwardly. As chamber 71b is interposed between exhaust passages 83 and 83', when valve element 71a occupies the upper position, as shown in FIG. 2, passages 83 and 83' communicate with each other. On the other hand, if valve element 71a occupies its lowest position, passages 83 and 83' are blocked from each other by a land 71e of valve element 71a.

Valve element 71a will thus move downwardly and upwardly in accordance with the downward force exerted by spring 86 and the upward force due to the pressure supplied to chambers 71b and 71c. When line pressure $P_L$ is supplied to chamber 71b, the upwardly acting force of the line pressure is greater than the downwardly acting force of spring 86, so that land 71e is in its upper position and exhaust passages 83 and 83' are in communication with each other. In the absence of line pressure $P_L$ in chamber 71b, valve element 71a is subjected to an upwardly acting force by the pressure in exhaust passage 83, communicating with chamber 71c, and is subjected to the downwardly acting force of spring 86. As the force of spring 86 is always constant, valve element 71a will be displaced upwardly or downwardly in accordance with changes in the upwardly acting force exerted by the pressure in chamber 71c, to establish communication between passages 83 and 83' when the upwardly acting force is greater and to block passage 83 from passage 83' when the upwardly acting force is lesser. Thus, the passage 83, supplied from pressure regulator valve 52, will be maintained at a constant value corresponding to the force of spring 86.

Line pressure $P_L$ is supplied to chamber 71b of valve 71 from manual valve 55 through passage 87, in the position "D" of manual valve 55, and valve element 71a occupies its upper position to establish communication between exhaust passages 83 and 83'. The hydraulic pressure in chamber 70b of blocking valve 70 is exhausted at manual valve 55 through passages 74 and 73, so that valve element 70a occupies its lower position under the bias of spring 90. As mentioned above, change-over valve 61 is subjected to the throttle pressure Pth and the governor pressure Pgo to either block passage 101a from passage 105 or to establish communication between these passages. Under these conditions, if valve element 61a of change-over valve 60 is moved upwardly during low vehicle speeds, and the hydraulic pressure in passage 105 is exhausted through port 111, then there is no pressure exerted in chamber 82 of pressure regulator valve 52. Thus, valve element 52a of valve 52 will be under the control of the downward force exerted by spring 85 and the upward force exerted by the pressure in chamber 81. As chambers 81 and 80 are maintained at the same pressure, the pressure in chamber 80 controls the flow of oil to exhaust passage 83, and thus will be equalized to the pressure corresponding to the force of spring 85. The resultant hydraulic pressure is supplied to passage 101 as the line pressure $P_L$. This line pressure is illustrated at $P_{L2}$ in the characteristic curve of FIG. 5.

As the vehicle speed increases, valve element 61a of valve 61 will move downwardly due to the increased governor pressure Pgo, to establish communication between passages 101a and 105. Thereby, line pressure $P_L$ is supplied to chamber 82 of pressure regulator valve 52 to exert an upwardly acting force in opposition to the force of spring 85, on valve element 52a, so that the pressure acting in chamber 81 will be sufficient even if reduced by a value equal to the pressure acting in chamber 82. Accordingly, under these conditions, the pressure in chamber 80 effects control of the oil exhaust to exhaust passage 83, thereby creating a lower and constant line pressure, which is illustrated at $P_{L1}$ in the characteristic curves of FIG. 5.

With reference to the foregoing description, when manual valve 55 is in the position "D", the line pressure $P_L$, as shown in FIG. 5, is changed, in the low speed range, from a constant line pressure $P_{L2}$ stepwise to a lower and constant line pressure $P_{L1}$, in accordance with increases in the speed of the vehicle. The particular vehicle speed at which the line pressure is changed from the value $P_L2$ stepwise to the value $P_{L1}$ differs in dependence upon the opening of the engine throttle valve. Thus, with only a small opening of the throttle valve, the throttle pressure Pth provided by throttle valve 54 is low, so that valve element 61a of change-over valve 61 is moved downwardly by a low governor pressure Pgo resulting from a comparatively low vehicle speed. Consequently, the line pressure $P_L$ will change stepwise, at a comparatively low vehicle speed, with only a small opening of the throttle valve. With an increase in the opening of the engine throttle valve, the throttle pressure Pth also increases gradually. Thus, valve element 61a of change-over valve 61 will move upwards under a much higher governor pressure Pgo.

Thus, the change-over point of the vehicle speed at which the line pressure $P_L$ is changed stepwise will gradually shift in the direction of higher vehicle speed, with increase of the engine throttle opening. Since a component of the throttle valve pressure Pth is applied to change-over valve 61, the shift point, at which the line pressure $P_L$ is changed stepwise, differs in dependence on the opening of the engine throttle valve.

In positions "L" and "2" of manual valve 55, cut-off valve 71 maintains the same position as when manual valve 55 is in position "D", but passage 73 has the line pressure supplied thereto. As a result, passage 74, or chamber 70b of blocking valve 70, will either receive the line pressure $P_L$ or will relieve pressure to exhaust port 77, in accordance with the position of relay valve 75. Under the condition that the pressure in passage 74 or in chamber 70b of valve 70 is exhausted due to downward displacement of relay valve 75, the same pressure control as occurs when manual valve 55 is in position "D" will be effected, and thereby the line pressure $P_L$ changes in a similar manner. However, when relay valve 75 occupies the upper position shown in FIG. 2, when line pressure $P_L$ is supplied to passage 74 or chamber 70b of valve 70 through passage 73, valve element 70a of blocking valve 70 is moved upwardly by the line pressure $P_L$ to shift upwardly valve element 61a of change-over valve 61 and to maintain this valve element in the upper position.

As the upwardly acting force, due to line pressure $P_L$ in chamber 70b, is preselected to be greater than the maximum downward force of the governor pressure Pgo exerted in chamber 61c, valve element 61a is maintained in the upper position irrespective of the vehicle speed. In this position, the pressure in passage 105 is exhausted to change-over valve 61 to exhaust valve 111, so that there is no pressure in chamber 82 of pressure regulator valve 52 and no pressure exerted on valve element 52a. In position "D", the oil pressure in chamber 80 takes the value $P_{L2}$ corresponding to the force of spring 85. In other words, in the illustrated position of relay valve 75, namely when oil chamber 70b of blocking valve 70 has been supplied with line pressure PL through passage 73, or at a throttle opening of less than one-quarter of the opening at which the accelerator peddle is released in engine braking, the line pressure $P_{L2}$ is provided independently of the vehicle speed.

Furthermore, relay valve 75 acts to supply line pressure $P_L$ to passage 74, and to exhaust passage 74 to exhaust port 77. However, valve 75 is subjected to the throttle pressure Pth in passage 103 so that, when the throttle pressure Pth is lower than a predetermined value, for example when the opening of the engine throttle valve is below one quarter of full opening, passage 73 and passage 74 are connected to each other to supply the line pressure to passage 74. Thus, as above described, the hydraulic pressure control will be carried out under the condition that change-over valve 61 is maintained in the upper position. On the contrary, when throttle pressure Pth is over the predetermined value, for example when the opening of the engine throttle valve exceeds one quarter of the full opening, passage 73 and passage 74 are blocked from each other and the pressure in passage 74 is exhausted. Thus, the hydraulic pressure control will be carried out in a manner similar to that when manual valve 55 is in position "D".

When manual valve 55 is moved to the position "R", to place the vehicle in reverse, the pressure in passage 87, through passage 110, is exhausted in manual valve 55 so that, due to the absence of pressure in chamber 71b of cut-off valve 71, valve element 71a, in contrast to when the manual control valve 55 is in the position "D", "2" and "L", is moved to the lower position by the force of spring 86. Thus, chamber 71d interconnecting exhaust passages 83 and 83', is blocked by land 71e.

With manual control valve 55 in position "R", since passage 83 is blocked from exhaust passage 83', the hydraulic pressure applied to passage 83 accumulates to establish an extremely high value which is greater than the maximum value regulated by pressure regulator valve 52, or greater than the line pressure $P_{L2}$ in the "D" position. Thus, the pressure in chamber 80 of pressure regulator valve 52 also obtains a very high value to maintain valve element 52a in an upper position so that chamber 80 is maintained in continuous communication with exhaust passage 83. As a result, regulator valve 52 does not perform any pressure regulating function.

The hydraulic pressure of passage 83, due to blocking of exhaust passage 83', is thus applied to passage 101 as the line pressure $P_L$ when manual valve 55 is in the position "R". This line pressure $P_L$ is regulated by cut-off valve 71 to a pressure such that the value of the pressure in exhaust passage 83, acting upwardly on valve element 71a of cut-off valve 71 through chamber 71c, balances the downward force exerted by spring 86.

The regulating action of cut-off valve 71 occurs by virtue of valve element 71a being urged downwardly by spring 86 to block chamber 71d by land 71e. However, when the pressure in exhaust passage 83 increases even higher, due to the hydraulic fluid under pressure discharged by oil pump 51 under blocked-off condition, the pressure in exhaust passage 83, acting on valve element 71a through chamber 71c, urges valve element 71a upwardly. When the upward force overcomes the downward force of spring 86, valve element 71a moves upwards sufficiently to unblock chamber 71d, thus permitting release of the pressure oil to passage 83'. Consequently, the pressure in exhaust passage 83 is regulated at a constant value corresponding to the force of spring 86.

The rectilinear line $P_{L3}$ in the characteristic curve shown in FIG. 5 illustrates the line pressure obtained by the regulating function of the cut-off valve 71. As will be apparent, the line pressure $P_{L3}$ exerted when manual control valve is in position "R", is much higher than the line pressures $P_{L1}$ and $P_{L2}$ prevailing when manual control valve is in the positions "D" and "2". This is a characteristic feature of novelty of the control system of the present invention. Moreover, line pressure $P_{L3}$ is established when manual control valve 55 is in the positions "N" and "P" by virtue of the same operation as described in connection with movement of manual control valve 55 to position "R". Thus, the line pressure during reverse operation of the vehicle is maintained much higher than the line pressure effective during forward operation of the vehicle, to assure positive and safe operation of the clutches and brakes.

Figure 3:
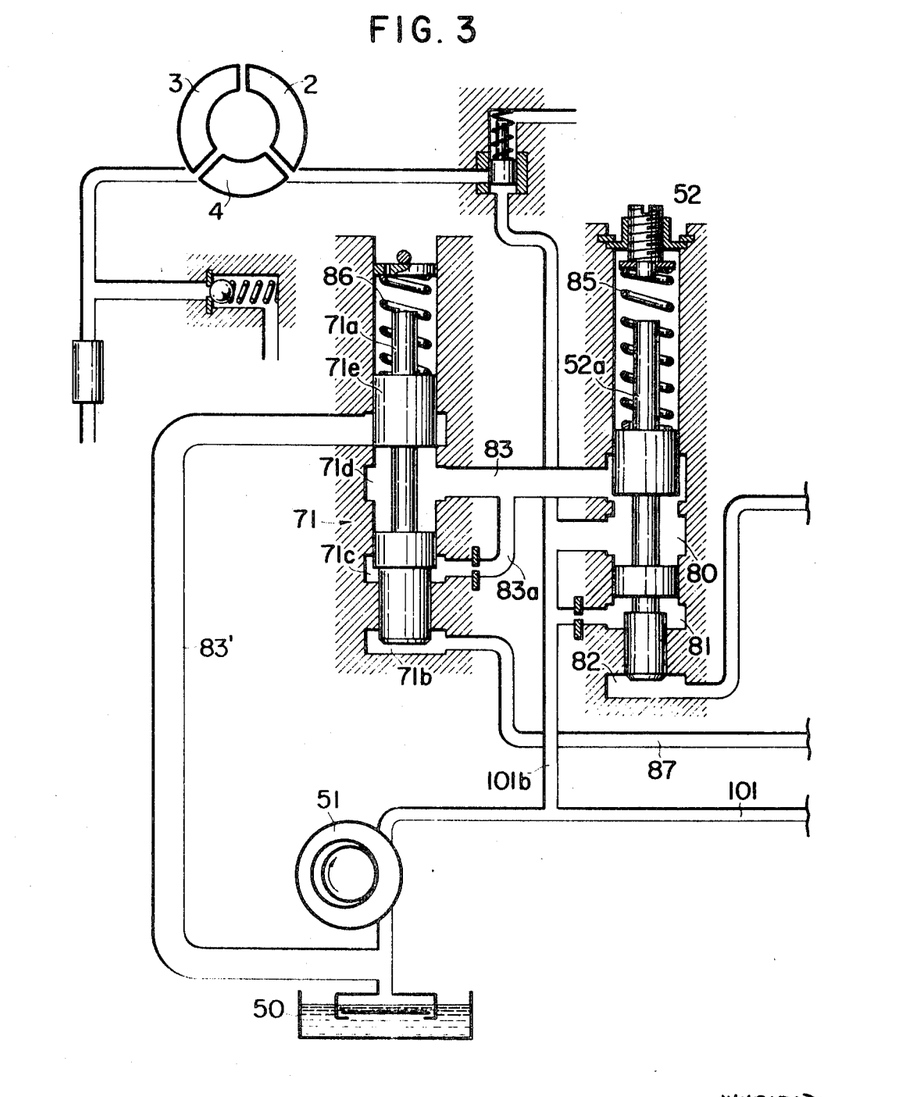
FIG. 3 is a schematic illustration, in greater detail than FIG. 2, of a part of the control circuit of FIG. 2 and illustrating a pressure regulator valve and a cut-off valve under operating conditions different from those illustrated in FIG. 2.

The position of valve 71, when performing the pressure regulating function, is illustrated to a somewhat larger scale in FIG. 3.

Figure 4:
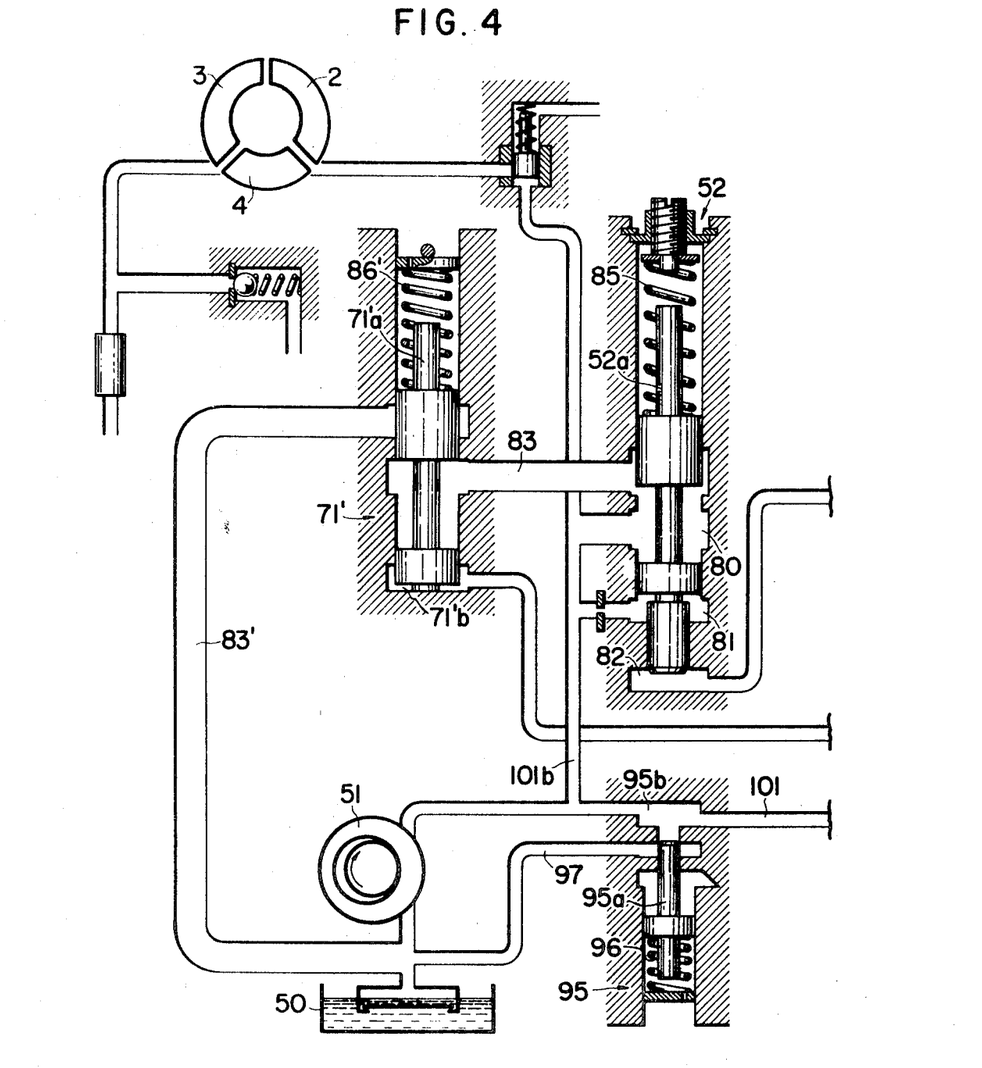
FIG. 4 is a view, similar to FIG. 3, illustrating a control circuit for only the pressure regulator valve and the cut-off valve in accordance with another embodiment of the invention.

FIG. 4 illustrates another embodiment of the invention, with parts being illustrated in the position they occupy when manual control 55 is in position "R". In the embodiment of the invention shown in FIGS. 2 and 3, the accumulated hydraulic pressure in exhaust passages 83 and 83' is regulated to a predetermined constant value by the provision of oil chamber 71c and cut-off valve 71. However, in the embodiment of the invention shown in FIG. 4, cut-off valve 71' is not formed with any chamber corresponding to chamber 71c, and acts to either block off passages 83 and 83' from each other, or to maintain communication between these passages, only in accordance with the force exerted by a spring 86' and the force exerted by hydraulic pressure in chamber 71b'. Regulation of the pressure accumulated in exhaust passage 83 is effected by a separate regulator valve 95 installed in line pressure passage 101.

Regulator valve 95 has a spring 96 exerting an upward bias at the lower end of the valve element 95a. The upper end of valve element 95a extends into passage 101 to form an oil chamber 95b, in which the line pressure $P_L$ is effective as a downward force on valve element 95a. When the accumulated oil pressure in passage 83 increases, or when the hydraulic pressure in passage 101 increases, in the reverse position "R" of manual control valve 55, the pressure attains a value such as to act to move valve element 95a downwardly against the upward bias exerted by spring 96. At such value of the pressure, valve element 95a is moved sufficiently far in a downward direction to exhaust pressure fluid in line 101 to exhaust passage 97. Thereby, the hydraulic pressure effective in line 101 is maintained at a predetermined high pressure value $P_{L3}$ in the same manner as described for the embodiment of the invention shown in FIGS. 2 and 3.

The hydraulic control system of the invention has been described as applied to an automatic transmission having three forward speeds and one reverse speed. However, it will be understood that the control system is not limited to an automatic transmission of this type, but is equally applicable to automatic transmissions having more or less than three forward speeds, more than one reverse speed, or both.

While specific embodiments of the invention have been shown and described to illustrate the application of the principles of the invention, it will be understood that the invention may be embodied otherwise without departing from such principles.

What is claimed is:

1. In a hydraulic control system for an automatic transmission for automotive vehicles, of the type including a gear changing unit having brakes and clutches controlled by hydraulically operated servo units, hydraulic torque transmitting means coupling the gear changing unit to the vehicle engine, a pump coupled to the engine and supplying hydraulic fluid under pressure to the automatic transmission, a manually operable speed selector valve, a pressure regulating valve subjected to the pump pressure and controlling the line pressure applied to the servo units and to the manually operable speed selector valve, and a hydraulic fluid supply system, including supply and return passages connected to the pump, interconnecting the servo units, the pump, the pressure regulating valve and the speed selector valve; the improvement comprising, in combination, pressure responsive valve means interposed in a passage connecting said pressure regulating valve to the pump return passage and controlling connection of said pressure regulating valve to the pump return passage; and passage means connecting said pressure responsive valve means to said speed selector valve for selective operation of said valve means; said speed selector valve, in forward speed positions, connecting said passage means to the line pressure to operate said pressure responsive valve means to a position establishing substantially unrestricted connection of said pressure regulating valve to the pump return passage; said speed selector valve, in at least the reverse position, connecting said passage means to exhaust to displace said pressure responsive valve to a position at least substantially interrupting connection of said pressure regulating valve to the pump return passage, whereby the pressure regulating function of said pressure regulating valve is controlled in accordance with the positions of said speed selector valve to condition said pressure regulating valve to maintain a substantially higher line pressure in at least the reverse position of said speed selector valve.

2. In a hydraulic control system for an automatic transmission, the improvement claimed in claim 1, including means operable, in at least the reverse position of said speed selector valve, to subject said pressure responsive valve means to the line pressure; whereby, when said speed selector valve is in the reverse position, said valve means regulates said line pressure to a value substantially higher than the value controlled by said pressure regulating valve when the latter is fully effective.

3. In a hydraulic control system for an automatic transmission, the improvement claimed in claim 2, in which said valve means include a second pressure regulating valve effective to regulate said line pressure applied to the servo units only when said manual speed selector valve is in the "reverse" position; said second pressure regulating valve controlling said line pressure to a value substantially higher than the value controlled by said first-mentioned pressure regulating valve.

4. In a hydraulic control system for an automatic transmission, the improvement claimed in claim 1, in which said valve means includes a cut-off valve controlling connection of said pressure regulating valve to the pump return passage and operable, responsive to movement of said speed selector valve to the "reverse" position, to block connection of said pressure regulating valve to the pump return passage, whereby said pressure regulating valve is subjected solely to the pump supply pressure and is ineffective to effect control of said line pressure; said cut-off valve, when said speed selector valve is in a "forward" speed selecting position, establishing communication between said pressure regulating valve and the pump return passage.

5. In a hydraulic control system for an automatic transmission, the improvement claimed in claim 4, means operable, when said cut-off valve, is in a position blocking connection of said pressure regulating valve to the pump return passage, to subject said cut-off valve to the line pressure to operate as a second pressure regulating valve controlling the line pressure to a value substantially higher than the value controlled responsive to pressure regulating operation of said first-mentioned pressure regulating valve.

6. In a hydraulic control system for an automatic transmission, the improvement claimed in claim 4, in which said hydraulic fluid supply system includes a line pressure passage connected to the pump supply passage and to said pressure regulating valve; and a second pressure regulating valve interposed in said line pressure passage and operable, responsive to the substantial increase in pressure in said line pressure passage resulting from the blocking action of said cut-off valve, to control the line pressure applied to the servo units to a value substantially higher than the value controlled by said first-mentioned pressure regulating valve when operating as a pressure regulator.

7. In a hydraulic control system for an automatic transmission, the improvement claimed in claim 1, including a governor valve providing a governor pressure corresponding to the vehicle speed; a throttle valve providing a throttle pressure corresponding to the throttle opening of the vehicle engine; said hydraulic fluid supply system including a line pressure passage and a branch line pressure passage connected to said line pressure passage and to a chamber of said pressure regulating valve to subject said chamber to the pressure in said line pressure passage; and a change-over valve interposed in said branch line pressure passage and subjected to said governor pressure and said throttle pressure acting in opposition to each other; said change-over valve, when said throttle pressure is in excess of said governor pressure connecting said chamber to the pump return passage and, when said governor pressure is in excess of said throttle pressure, connecting said chamber to said branch line pressure passage.

8. In a hydraulic control system for an automatic transmission, the improvement claimed in claim 7, including a spring biasing said change-over valve to a position connecting said chamber to a pump return passage; said valve means including a blocking valve and having a valve element engaged with said spring and having a second chamber connected by a control passage to said speed selector valve; said control passage being subjected to the line pressure when said speed selector valve is in at least one "forward" speed position to apply pressure to said valve element to operate, through said spring, to maintain said change-over valve in a position connecting said first-mentioned chamber to the pump return passage.

9. In a hydraulic control system for an automatic transmission, the improvement claimed in claim 8, including a relay valve interposed in said control passage and including a second valve element subjected to said throttle pressure and to the pressure of a second spring, acting in opposition to each other; said second valve element, responsive to the throttle pressure exceeding a preselected value, moving to a position connecting said blocking valve chamber to the pump return passage.

* * * * *